UNITED STATES PATENT OFFICE.

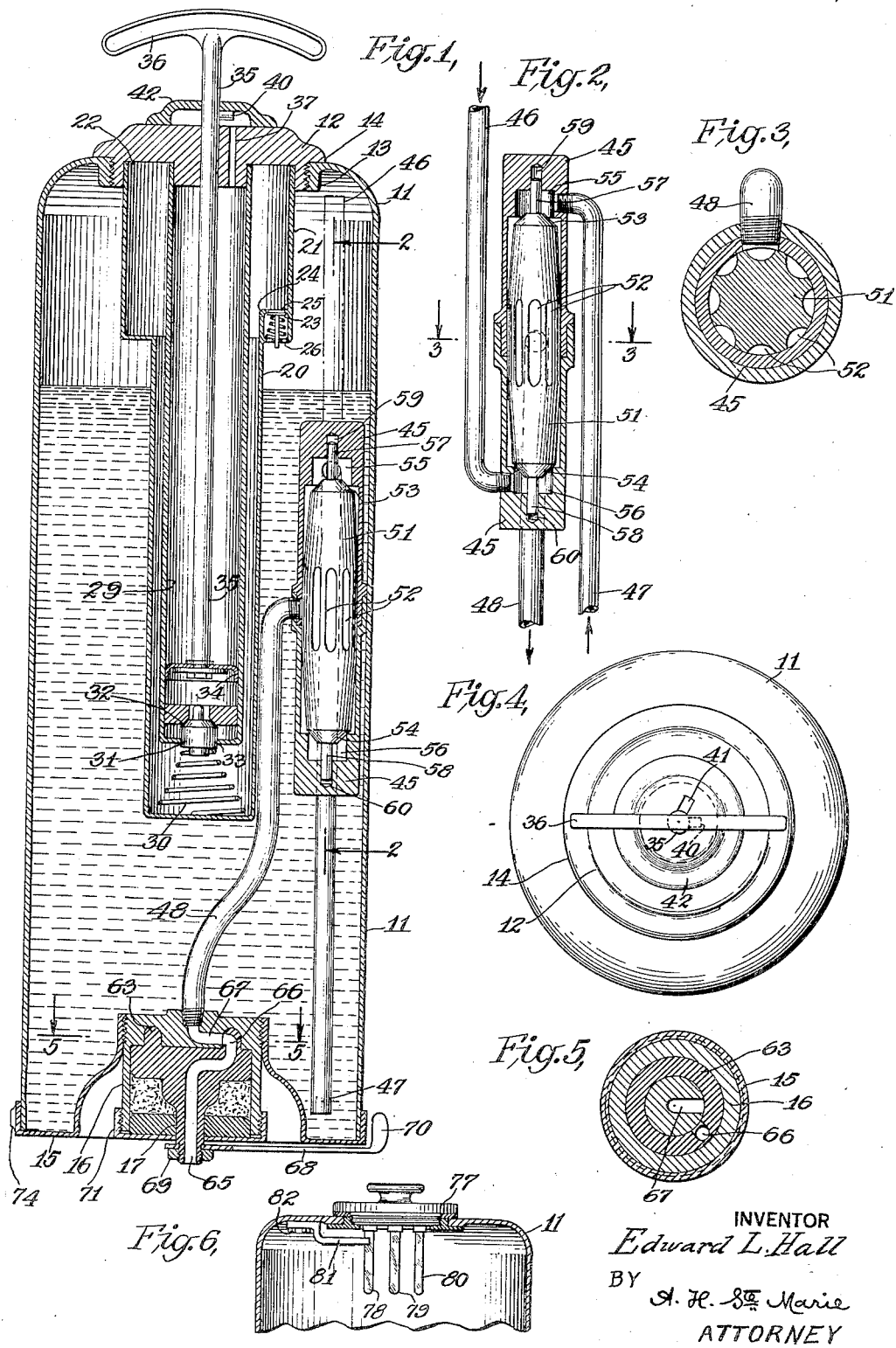

EDWARD L. HALL, OF NEW YORK, N. Y.

FIRE-EXTINGUISHER.

1,326,927. Specification of Letters Patent. Patented Jan. 6, 1920.

Application filed May 27, 1918. Serial No. 236,769.

*To all whom it may concern:*

Be it known that I, EDWARD L. HALL, a citizen of the United States, and a resident of the borough of Manhattan, in the city of New York, county of New York, and State of New York, have invented certain new and useful Improvements in Fire-Extinguishers, of which the following is a specification.

This invention relates generally to fire-extinguishing apparatus, and more particularly it appertains to that class of portable, hand-operated implements which are employed for putting out incipient fires, such for instance as a sudden blaze caused by the explosion of some gaseous fuel about the engine of an automobile, or flames originating from spontaneous combustion, and so forth.

An important object of the invention is to provide an improved implement of the type set forth, capable of being operated effectively in any conceivable plane, that is, whether it be directed upwardly, or turned downwardly, or tilted at any intermediate angle, or held horizontally in what was hitherto considered as a neutral position.

Another object is to produce an implement of the nature referred to wherein the actuating parts are under immediate control, and so connected with a detachable closure that the same can be readily removed together to permit filling or refilling the implement with the required chemicals, or enable it to be promptly overhauled, in case any repairs are needed.

A further object is the production of an implement of the class mentioned characterized by the simplicity of its structural design, its responsiveness to appropriate manipulation, and the convenient means whereby it is enabled opportunely to discharge its contents in the requisite direction.

Other objects and advantages of the invention will become apparent as the specification proceeds.

A practical embodiment of the invention is illustrated in the drawing annexed, in which Figure 1 is a central longitudinal section; Fig. 2 is a partial section on the line 2—2 of Fig. 1, looking toward the left; Fig. 3 is a transverse section on the line 3—3 of Fig. 2, looking downward; Fig. 4 is a top plan view; Fig. 5 is a cross-section on the line 5—5 of Fig. 1, again looking in a downward direction; and Fig. 6 is a fragmentary view, partly in section, showing a modified form of the invention.

The reference numeral 11 represents a container, which is preferably made of cylindrical form, as seen in Figs. 1, 4, and 6. This container may be filled, for the greater part thereof, with any chemical of approved composition adapted to extinguish a flame, for instance, carbon tetrachlorid. It is, of course, intended to be fluid and air tight, or substantially so, and therefore it is provided with appropriate closures at the opposite ends. A screw-top 12 closes the upper end in the construction exemplified in Figs. 1 and 4, the same engaging a flanged rim 13, and extending outwardly thereover, as at 14. The lower end, Fig. 1, is closed by a flanged cap 15, centrally recessed to receive a stuffing-box 16, and a nozzle 17, arcuately movable therein.

From the under side of the screw-top 12, depends an air-chamber 20, arranged to dip centrally in the fluid poured into the container 11. This chamber, as indicated in Fig. 1, may consist of a tube closed at its inner end, and formed with an enlargement 21, at its outer end, entering a groove 22, in the under side of the screw-top. The open end of the enlargement, it will be noted, is closed by the adjoining walls of the groove, with the outer side of which it remains in close contact. A spring-pressed valve 23, seated in a small casing or compartment 24, of the said enlarged part 21 of the chamber 20, normally closes a port 25 in the latter, which when opened allows air therefrom to reach the liquid in the container through a plurality of perforations 26.

Centrally within the said air-chamber is suspended, also from the under side of the screw-top 12, an air-pump barrel 29, extending from the inner side of the groove 22 down to a volute-spring 30, resting upon the closed submerged end of the air-chamber. The volute-spring carries at its upper end a valve 31, arranged to be pressed thereby upwardly against a seat 32, disposed across the lower end of said barrel, the latter being suitably apertured at 33, to permit ascent and descent of the valve. Above the seat 32, the barrel is engaged by a piston 34, reciprocated by means of a rod 35, that passes out through a central bore of the screw-top and is furnished with an operating handle 36. A vent-hole 37 is also bored through the screw-top to enable the piston to work properly during its reciprocation.

Means are provided to prevent retraction of the piston-rod 35 from the barrel 29, when the implement is not in operation. As represented in Figs. 1 and 4, these means may consist simply of a lateral projection 40, on the rod 35, adapted to be passed through a slot 41, in a small cover plate 42, secured on the middle portion of the screw-top 12. It will be observed that the cover 42 is centrally raised, so that the projection 40 can be freely turned thereunder with the piston-rod. The rod and its piston are then safely retained in their inoperative position. But, by turning back the projection opposite the slot 41, it can be withdrawn therethrough, and the rod and piston will again be capable of reciprocation as before.

The liquid stored in the container 11, it will be understood, is forcibly ejected by compressed air from the chamber 20, and discharged through a valve chamber connected with the nozzle 17, hereinbefore mentioned. The latter-named chamber, as shown in Figs. 1, 2 and 3, consists of a cylindrical casing 45 conveniently made of two parts joined at the center and closed at both ends. It is located in the middle portion of the container at one side thereof, and is fitted with two intake tubes 46, 47, and an intermediate tubular discharge 48. The tubes communicate laterally with the opposite ends of the chamber 45, and extend outward from their respective connections therewith to points in close proximity to the screw-top 12 and cap 15 of the container. It is to be noted that the intakes are arranged to receive the liquid in the container at the ends thereof that are remote from their said connections with the valve chamber. Thus, the intake tube 46, communicating with the lower end of the chamber, receives the liquid from the upper end of the container, while the tube 47, which communicates with the upper end of the chamber, takes the liquid at the lower end of the container. The discharge tube 48 is in communication with the central portion of the chamber, preferably, and thence extends downwardly to the stuffing-box 16, through which it reaches the nozzle 17, as hereinafter described.

A valve member 51 is placed inside the said valve chamber, and adapted to slide by gravity toward either end thereof according to the position in which the container is held during the operation of the implement. In the present exemplification of the invention, this valve member consists of a cylindrical body tapered at both ends, and corrugated or furrowed circumferentially, as at 52, in the direction of its length. The ends of the member are beveled, as at 53 and 54, respectively, so that they may enter and be seated alternately in recesses 55 and 56, formed at the ends of the chamber 45, wherein the intake tubes 46 and 47 are fitted. Owing to this arrangement, the said member acts as a double valve, controlling both intakes. The valve is centered within its chamber by means of pins 57 and 58, projecting from its opposite ends and sliding in holes 59 and 60, provided therefor in the closed ends of the chamber. The furrows or corrugations 52, which impart the shape of a pinion to the central portion of the valve member, practically eliminate all friction between it and the interior walls of its said chamber, and combined with the tapered ends thereof enable the member to move freely at all times from one intake to the other, as conditions require.

The stuffing-box 16, before referred to, is rigidly secured in position within the recessed end of the container 11, that is, in the reëntrant portion of the cap 15 thereof. This may be effected with the aid of solder, or by means of screw-threads as indicated in Fig. 1, or in any other suitable manner. The nozzle 17 is seated in the bottom or inner part of this stuffing-box, within which it is designed to have an arcuate movement. With that purpose in view, the base of the nozzle is provided with an annulus 63, fitted in a correspondingly-shaped groove in the stuffing-box, which guides the nozzle in its movement and maintains the discharge orifice thereof properly centered always, that is, axially disposed. The annulus further serves to cut off the discharge through the nozzle, when the implement is not in use. It will be seen, by reference to Figs. 1 and 5, that the nozzle has a discharge channel 65, bored centrally through it, and offset laterally, as at 66, in one side of the nozzle base. The offset portion 66 of the channel 65 traverses the annulus 63, and is adapted to register with a short passage 67, in the bottom of the box 16, with which the delivery end of the discharge tube 48 is connected. The nozzle is turned within the stuffing-box by means of a lever 68, attached to its outer end and extending outwardly over the surface of the cap 15. A lock-nut 69 holds the lever securely on the end of the nozzle. The lever is also provided with a finger-piece 70, by means of which it can be swung to one side or the other to turn the nozzle slightly, as required either to establish an uninterrupted communication between the channel 65, offset 66, passage 67, and discharge tube 48, or to cut off the communication. Fig. 1 shows the parts positioned to permit discharge through the nozzle, whereas Fig. 5 represents the same out of alinement. The nozzle is held to its seat within the stuffing-box by means of a nut 71, screwed thereover.

The operation of the implement, in so far as it concerns the form thereof above described, is as follows: Assuming that the air in the container has not been previously compressed, the handle 36 is first turned so as to unlock the piston-rod 35 and pull it out, by causing the projection 40 to pass through the slot 41, in an outward direction. Next, the lever 68 is turned as required to bring the channel 65 of the nozzle 17, and its offset 66, into register with the passage 67 and the discharge tube 48. Then the implement is pointed toward the flame to be extinguished, and for the latter purpose, the flange of the cap 15 is provided with a sight 74, which enables the operator to obtain a general aim in using the implement. The sight 74 is located, preferably, on the side of the container opposite that where the finger-piece 70 of the lever 68 is situated, so that when alined with the sight the lever will hang from the implement, as it were, and insure constant communication of the nozzle with the discharge tube while the implement is aimed at the fire to be put out. Thus positioned, the lever indicates that the discharge is open, and at the same time, that the valve chamber 45 and its intakes 46, 47 are lying approximately lowermost within the implement, as held in the hands of the operator, that is, in the location required to obtain the best results. The implement having been properly directed, the piston 34 is reciprocated rapidly in the barrel 29, by means of the rod 35 and handle 36. This compresses the air in the barrel, which is thereby forced past the valve 31, and caused to fill the air-chamber 20 and its enlargement 21. Thence the air is made to flow into the container 11, through the port 25. As it reaches the interior of the container, the compressed air immediately expels the tetrachlorid or other chemical therein, by way of the valve chamber 45, through either of the intakes 46, 47, and the central discharge 48. If the implement be pointed upwardly, the liquid will be forced into the intake tube 46 and will enter the chamber at the remote end from the entrance to this tube, the valve 51 moving then of its own weight to a point nearer to the said entrance. On the other hand, if the implement be inclined downwardly, the intake tube 47 will receive the liquid, which in that case again will reach the chamber at the remote end therefrom, the valve 51 changing its position to suit, by gravity. Now, assuming that the implement be brought to a horizontal position, it will continue to discharge the liquid, because the valve member in such a case remains in whichever position it last assumed, for, it must be observed that there are two forces constantly acting upon it, namely, the liquid forced past the same to the central discharge of the valve chamber and the compressed air expelling the liquid. Consequently, there is no inoperative position for this implement, and it is free from that "air-spitting" feature which is met with in some other constructions. If the air in the container be compressed beforehand, there is nothing to do in using the implement but to open the discharge by means of the lever, and point the nozzle toward the fire to be extinguished.

Fig. 6 illustrates a modified form of the invention wherein the air-compressing appliance is dispensed with, and the expanding energy of some chemical is utilized instead, to expel the liquid from the container. As shown in this figure, the container 11 has a screw-top 77, from the under side of which depend vials 78, 79, and 80, designed to hold each some ingredient or composition capable, upon being released, of mixing with the carbon tetrachlorid or other liquid in the container in such a way as to generate powerful gases or vapors that will force the liquid out in a volume proportionate to the expansion of such gases or vapors. The vials may be broken one at a time, to limit the outflow of the liquid to the quantity exactly needed to put out a blaze. To that end, the container is provided within the top portion thereof with a blade 81, or similar instrument, designed to break the vials one after another by forced contact with the same. The blade 81, it will be seen, is rigidly secured at 82, on the under side of the top and projects centerward interiorly of the container into the path of the vials. The latter, being suspended from the screw-top, will be brought to the blade and be broken thereby in succession, by giving the screw-top a partial rotation. The vials, if made equal in size as illustrated, will each cause substantially the expulsion of the same amount of liquid from the container. Thus, for instance, the vial 78, when emptied of its contents by being broken against the blade 81, may relieve the container of one-third of the liquid stored therein; the vial 79 may force out a like quantity of the liquid; and the vial 80 may expel the remainder.

I claim:

1. A fire extinguisher including a container for a liquid, a discharge therefor, a valve chamber with closed ends and intermediate ports located within said container, a delivery pipe connecting said chamber with said discharge, intakes conveying the liquid to said ports at points remote from the adjacent ends of the container respectively, and a longitudinally grooved valve member bearing circumferentially upon the inner walls of the chamber, the ends of said member controlling the ports in said chamber from the interior thereof, one port being opened and the other port being closed alternatively.

2. A fire extinguisher including a container for a liquid, a stationary valve chamber disposed near one side therein, a discharge leading from said chamber out of said container, and a controlling lever depending from said discharge on the same side as the valve chamber.

3. A fire extinguisher including a container for a liquid, a relatively fixed valve chamber positioned within said container near one side, a discharge adapted to convey the liquid out of the latter from said chamber, and a sight on the container located remotely from the valve chamber on the opposite side of said discharge.

4. A fire extinguisher including a container for a liquid, a stationary valve chamber positioned within said container near one side, a discharge arranged to convey the liquid from said chamber to an outlet of the container, a lever at one end of the container operable on the same side thereof as the valve chamber so as to control said discharge, and a sight on the container diametrically disposed with relation to said lever.

In witness whereof I have hereunto signed my name this 24th day of May, 1918.

EDWARD L. HALL. [L. S.]